United States Patent [19]

Baumann

[11] 3,761,919

[45] Sept. 25, 1973

[54] RADIATION SENSITIVE KEYBOARD

[75] Inventor: Paul L. Baumann, Pleasanton, Calif.

[73] Assignee: The Singer Company, New York, N.Y.

[22] Filed: Aug. 14, 1972

[21] Appl. No.: 280,379

[52] U.S. Cl. .............. 340/365 P, 178/17 D, 197/98

[51] Int. Cl. .............................................. G06f 3/02

[58] Field of Search ............... 340/365 P; 178/17 D; 250/221, 222; 197/98

[56] References Cited

UNITED STATES PATENTS

| | | | |
|---|---|---|---|
| 3,056,030 | 9/1962 | Kelchner | 340/365 P |
| 3,372,789 | 3/1968 | Thiele et al. | 340/365 P |
| 3,526,775 | 9/1970 | Friedrich et al. | 340/365 P |

*Primary Examiner*—John W. Caldwell
*Assistant Examiner*—Robert J. Mooney
*Attorney*—Edward L. Bell et al.

[57] ABSTRACT

A radiation sensitive keyboard device having a plurality of photosensitive receptors mounted on a base member along with a plurality of light sources, and a plurality of manually actuatable key assemblies, each reciprocably carried in a plurality of recesses in a mounting plate and each associated to a different receptor. Each key assembly has a stem portion, a key top mounted on one end and a shield mounted on the other end for blocking light to the associated receptor when the key assembly is actuated. The base member has a resilient layer for providing a substantially light-tight seal with the proximal end of each shield and an initial cushion stop therefor when the key assembly associated thereto is actuated. Each key assembly is provided with a biasing means for providing a restoring force tending to urge the key assembly in a direction away from the associated receptor.

14 Claims, 3 Drawing Figures

RADIATION SENSITIVE KEYBOARD

BACKGROUND OF THE INVENTION

1. Field of the Invention

This invention relates to keyboards and more particularly to keyboards employing photosensitive receptors for providing output signals serving to identify an actuated key.

2. Description of the Prior Art

Several keyboards are known which employ photosensitive receptors for identifying which one of a plurality of manually actuatable keys is actuated, usually by a human operator. A well-known type of photoelectric keyboards such as that disclosed in U.S. Pat. No. 2,641,753 employs a plurality of light sources and photodetectors spaced therefrom and a plurality of interposed code card shutters, each one of which is provided with a manually actuatable key and a bias spring for restoring the shutter to a nonactuated position. A plurality of lenses are used to focus the light from the sources into a plurality of parallel beams, each one of which traverses the keyboard and irradiates a separate one of the detectors. Each code card shutter is provided with a number of depending code gags for blocking selected ones of the light beams when that card is depressed in order to identify an actuated key.

This type of photoelectric keyboard requires several sets of ground lenses and a corresponding number of light sources and detectors and is relatively expensive to manufacture. Further, the lenses, sources, and detectors must all be carefully aligned when assembling such a keyboard in order to minimize cross irradiation of the detectors, which renders this type of keyboard relatively expensive to construct.

Other photoelectric keyboards are known which employ rotatable, rather than reciprocable, code card shutters in conjunction with spaced light sources and photodetectors. These keyboards suffer from the same disadvantages as those noted above and, in addition, frequently provide poor operator touch characteristics, which is highly undesirable.

Still further types of photoelectric keyboards are known which employ spaced light sources and photodetectors and which provide an opening accessible to a human finger tip. In operation, insertion of a finger tip into an opening in such a keyboard blocks one or more light beams, thereby providing an indication of a selected character. This type of keyboard eliminates the highly important positive touch characteristic which human operators have been found to require for optimum keyboard operation. The absence of this positive touch characteristic severely limits the effectiveness of this type of keyboard.

SUMMARY OF THE INVENTION

The invention disclosed herein comprises a photosensitive keyboard which is inexpensive to manufacture, highly reliable in operation, and which provides excellent operator touch characteristics. More particularly, in the preferred embodiment a plurality of photosensitive receptors are mounted in associated relationship with a corresponding number of reciprocable key assemblies. Each key assembly has a key stem with a key top at one end and a shield at the other end for preventing radiation from reaching the associated receptor when the corresponding key assembly is manually reciprocated to an actuated position. The receptors are mounted on a base member which is provided with a resilient layer for providing a substantially radiation impervious seal and an initial cushion stop with a proximal end of the shield carried by an actuated key assembly. Also mounted on the base member are a plurality of radiation sources which may be less in number than the plurality of receptors. The base member is provided with a circumferential wall having a highly reflective inner surface for distributing the radiation from the several sources among the receptors.

Each key assembly is reciprocably mounted in a different one of a plurality of recesses in a mounting plate, with each key stem slidably received in a recess aperture and each recess sized to receive the associated key top. Each key stem is provided with a stop member which abuts a portion of the corresponding recess to provide a nonactuated reference position for that key assembly. A spring bias means coupled between the key assembly and the recess is provided for, normally urging each shield in a direction away from the associated receptor.

For a fuller understanding of the nature and advantages of the invention, reference should be had to the following detailed description taken in conjunction with the accompanying drawings.

DESCRIPTION OF THE PREFERRED EMBODIMENT

Figures 1, 2:
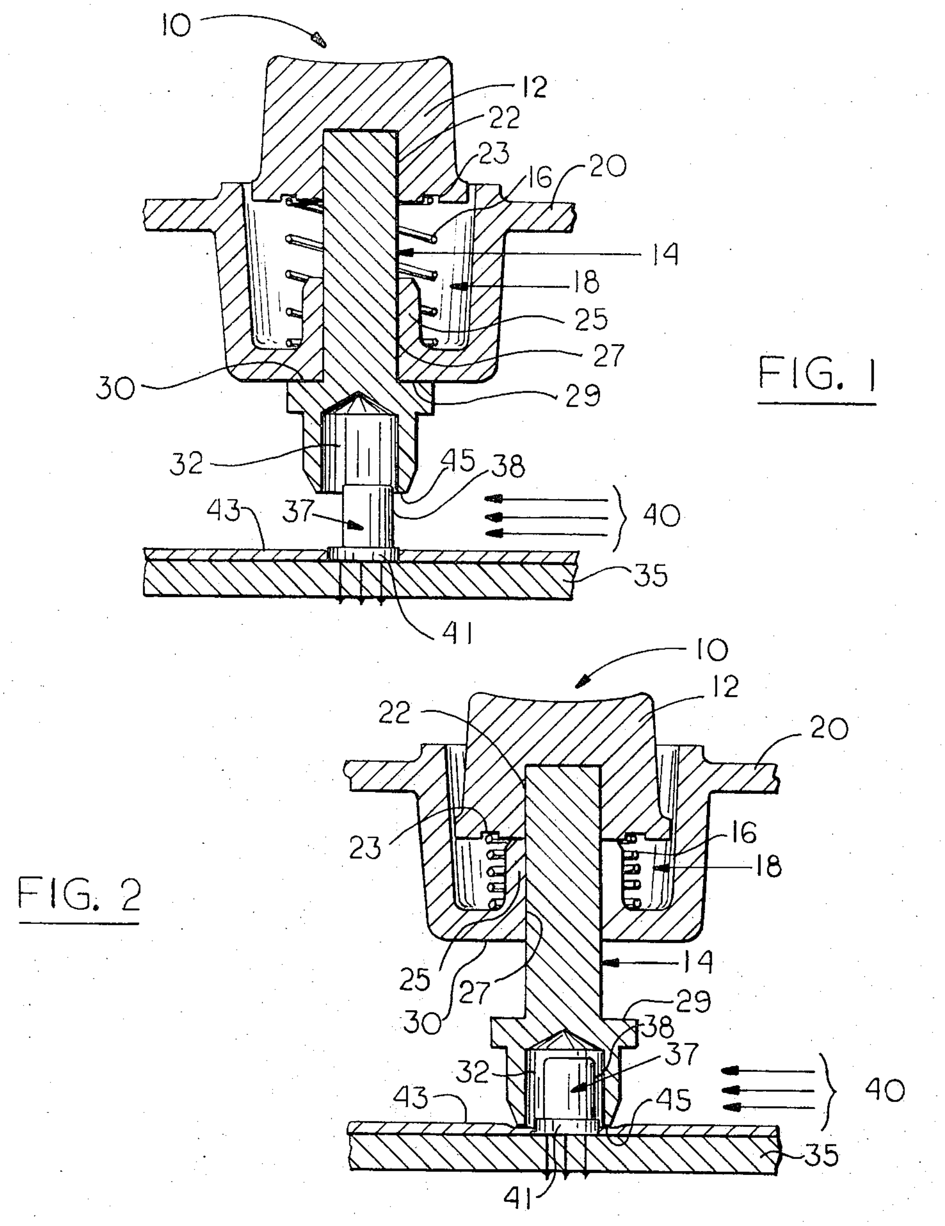
FIG. 1 is a sectional view of a preferred embodiment of the invention showing a single key assembly and receptor with the key assembly in the non-actuated or rest position.
FIG. 2 is a sectional view showing the key assembly of FIG. 1 in the fully actuated position.

Turning now to the drawings, FIGS. 1 and 2 illustrate a preferred single embodiment of the invention. A key assembly 10 having a key top 12, a key stem 14, and a bias spring 16 is mounted in a well 18 in a mounting plate 20. Key top 12 has a central recess 22 of a shape compatible with the cross-sectional configuration of key stem 14, e.g. circular, square, or rectangular, and a channel 23 for receiving the upper end of bias spring 16.

Well 18 has a perimetral configuration compatible with the lower cross-sectional configuration of key top 12 and is sized to provide sufficient clearance with the outer periphery of key top 12 to permit air contained in well 18 to freely exit therefrom when key assembly 10 is actuated. A central upstanding boss 25 is provided in well 18 for receiving the lower end of bias spring 16 and maintaining spring 16 substantially concentric with key stem 14 throughout the duty cycle of key assembly 10. Boss 25 has a central aperture 27 for slidably receiving the upper portion of key stem 14. If desired, a keyway may be provided in central aperture 27 and the upper portion of key stem 14 may have a mating key for preventing rotation of key assembly 10 when actuated.

Key stem 14 has a shoulder portion 29 for abutting the lower surface 30 of the bottom portion of well 18. The axial location of shoulder portion 29 on key stem 14 is selected to provide the desired reference position for key assembly 10 in the non-actuated or rest position shown in FIG. 1 and may vary in accordance with the particular requirements of a given application.

The lower end of key stem 14 has an internal recess 32 for controlling the amount of radiant energy incident on a photodetector in a manner to be described.

Key top 12 and key stem 14 may be constructed from any one of a wide variety of suitable materials known to those skilled in the art. Preferably, key top 12 and key stem 14 are molded from a suitable plastic material, such as ABS (acrylonitrile butadiene styrene) polymer compound, TEFLON, or DELRIN. Likewise, well 18 and mounting plate 20 may be constructed from any suitable material, e.g. aluminum, and are preferably molded as an integral unit from a suitable plastic material, such as ABS polymer compound. Other materials and methods of construction will occur to those skilled in the art.

Mounted below key assembly 10 on a base plate 35 is a receptor 37 having a radiation sensitive area 38. Base plate 35 preferably comprises a copper plated, glass-filled resin printed circuit board. Other suitable base plate materials will occur to those skilled in the art. Receptor 37 may comprise any one of a number of known devices, such as photocells, phototransistors, or photodiodes, which provides electrical output signals in response to radiation of a predetermined threshold intensity incident on sensitive area 38. The radiation is indicated schematically in FIGS. 1 and 2 by arrows 40. In the preferred embodiment, a GE 2N5777 photodiode was utilized in conjunction with a visible light source with excellent results. Receptor 37 is mounted on base plate 35 in a location which permits internal recess 32 of key stem 14 to pass over receptor 37 whenever key assembly 10 is depressed. It is noted that the inner circumference of internal recess 32 is of sufficient size to accommodate enlarged base portion 41 of receptor 37.

A resilient sheet 43 of rubber, polyurethane foam or the like is adhered to the upper surface of base plate 35. Sheet 43 provides a resilient contact area for bottom edge 45 of key assembly 10 and has two functions: first, to form a seal with a bottom edge 45 which is substantially impervious to the incident radiation; second, to provide a cushioned initial stop surface for key assembly 10.

In operation, radiation is first directed to radiation sensitive surface 38 of receptor 37, thereby causing receptor 37 to produce an output signal at a first level. When key assembly 10 is depressed and key stem 14 is moved in the direction of base plate 35, internal recess 32 of key stem 14 passes over receptor 37 and shields or blocks an increasingly greater portion of the total incident radiation from sensitive surface 38 until bottom edge 45 of key stem 14 contacts sheet 43, thereby shielding receptor 37 from substantially all incident radiation. As will be appreciated by those skilled in the art, the diminution in radiation incident on sensitive surface 38 causes the output signals from receptor 37 to change to a second level. This change in signal level thus provides an indication of the actuation of key assembly 10.

As key assembly 10 is depressed even further, sheet 43 compresses in the region adjacent bottom edge 45, providing a resilient force which increasingly opposes further movement of key stem 14 in a downward direction. In order to prevent the compressive force of bottom edge 45 on sheet 43 from permanently deforming or rupturing sheet 43, key assembly 10 and well 18 are so dimensioned that the bottom surface of key top 12 contacts the upper surface of central boss 25 when key stem 14 has traveled a short additional distance after initial contact occurs between bottom edge 45 and sheet 43. With this arrangement, the majority of downward forces transmitted by key assembly 10 is absorbed by boss 25, thereby avoiding the application of excessive forces to sheet 43. However, the initial cushion stop provided by sheet 43 avoids a sudden jolting cessation of key assembly movement. The position of key assembly 10 at the bottom of the key stroke, i.e. in the fully actuated position, is shown in FIG. 2.

When key assembly 10 is released, the upward force provided by compressed bias spring 16 and, initially, compressed sheet 43 urges key assembly 10 toward the non-actuated or rest position until the upper surface of shoulder portion 29 of key stem 14 contacts lower surface 30 of well portion 18, thereby preventing further upward motion of key assembly 10. When key assembly 10 has reached the non-actuated position, the radiation shielding provided by the lower, shield end of key stem 14 is removed, thereby allowing radiation to reach sensitive surface 38. As will be appreciated by those skilled in the art, restoration of the incident radiation or sensitive surface 38 causes the output signals from receptor 37 to return to the initial level. Repeated actuation of key assembly 10 proceeds in the manner already described.

Although the lower shield end of key stem 14 is shown as having an annular cylindrical wall portion which completely surrounds receptor 37 when key assembly 10 is in the fully actuated position, it has been observed that complete encasement of receptor 37 is not essential to the proper operation of the invention. Thus, internal recess 32 need only extend an arcuate amount sufficient to accomplish the above-described shielding of receptor 37 when key assembly 10 is in the fully actuated position. The arcuate extent of internal recess 32 required to accomplish this function has been found to be dependent upon the physical parameters of the particular receptor 37 employed and the solid angle subtended by the incident radiation and may be determined in an empirical manner.

Figure 3:
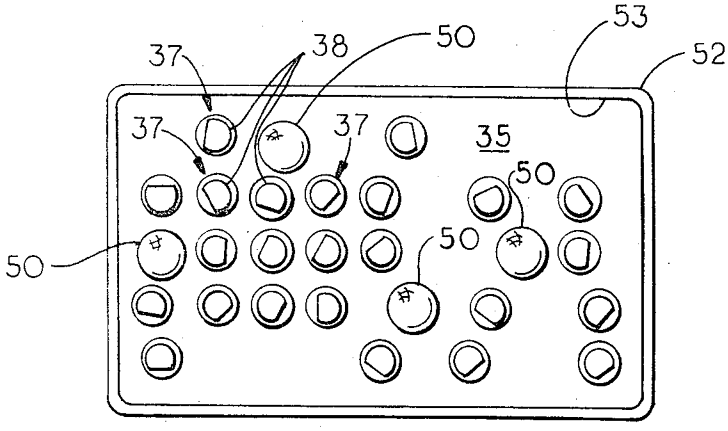
FIG. 3 is a schematic plan view illustrating the arrangement of energy sources and receptors in the preferred embodiment.

Although a single key assembly 10 is illustrated in FIGS. 1 and 2, in actual practice a number of these elements are incorporated into a single mounting plate 20 along with a corresponding number of wells 18 to form a keyboard. In such a device, a corresponding number of receptors 37 are positioned on base plate 35. If desired, each receptor 37 may be provided with a separate radiation source. As shown in FIG. 3, however, in the preferred embodiment receptors 37 are irradiated by a number of radiation sources 50 which is substantially less than the number of receptors. As seen in this figure, a plurality of radiation sources 50, e.g. 12 volt panel lamps, are mounted on a base plate 35. A group of receptors 37 is positioned adjacent each source 50, with the sensitive area 38 of each receptor 37 facing the associated source. As will be apparent to those skilled in the art, the actual number of receptors 37 which can be associated to a given source 50 varies with the physical dimensions of the receptors and sources, the intensity of radiation emitted by a given source 50, the amount of available space on base plate 35 and other factors, and may be most easily determined for a given application in an empirical manner.

In some applications, it has been found desirable to maximize the amount of radiation available in the volume of space above base plate 35 by providing a circumferential wall 52 having a highly reflective inner surface 53. Polished aluminum, foil, plated chrome, and aluminized transparent MYLAR have all been found to be highly effective materials for surface 53. Other suitable materials will occur to those skilled in the art.

As will now be apparent, the invention disclosed above provides a radiation sensitive keyboard which is simple in design, extremely economical to manufacture, and not prone to mechanical failure. Further, keyboards constructed according to the invention have been found to possess highly desirable operator touch characteristics due to the initial cushion stop provided by sheet 43.

While the foregoing provides a full disclosure of the preferred embodiment of the invention, it is understood that various modifications, alternate constructions, and equivalents may be employed without departing from the true spirit and scope of the invention. For example, other types of bias means than illustrated spring 16 may be employed to provide a restoring force to each key assembly 10. Also, key stems having an internal recess 32 which is asymmetrical with respect to the body axis of key stem 14 may be utilized in keyboards constructed according to the invention. Therefore, the above description and illustrations should not be construed as limiting the scope of the invention, which is solely defined by the appended claims.

What is claimed is:

1. A keyboard device comprising:

a photosensitive receptor for producing an output signal in response to irradiation by incident radiation of a predetermined intensity; and a manually actuatable key assembly for shielding said receptor from said radiation in response to the actuation thereof, said key assembly including a reciprocable key stem having a key top at one end and a radiation blocking shield at the other end for partially surrounding said receptor when said key assembly is actuated.

2. The apparatus of claim 1 wherein said shield is axially aligned with said receptor.

3. The apparatus of claim 1 wherein said shield is formed in a shape for completely surrounding said receptor when said key assembly is actuated.

4. The apparatus of claim 3 wherein said receptor has a substantially cylindrical shape and said shield has a cylindrical recess sized to receive said receptor.

5. The apparatus of claim 1 further including a base member for mounting said receptor, said base member having a resilient layer for providing a substantially radiation impervious shield with the proximal end of said shield and a cushion stop therefor when said key assembly is actuated.

6. The apparatus of claim 1 further including bias means for urging said shield in a direction away from said receptor.

7. A keyboard device comprising:

a plurality of photosensitive receptors, each said receptor having means for producing an output signal in response to irradiation by incident radiation of a predetermined intensity;

a plurality of manually actuatable key assemblies, each key assembly arranged to shield a different one of said receptors from said radiation in response to the actuation thereof;

each said key assembly including a reciprocable key stem having a key top at one end and a radiation blocking shield at the other end for partially surrounding the associated receptor when said key assembly is actuated; and a plurality of radiation sources for supplying said incident radiation.

8. The apparatus of claim 7 wherein the number of said radiation sources is less than the number of said receptors.

9. The apparatus of claim 7 further including a base member for mounting said receptors, said base member having a circumferential wall with a radiation reflective surface for distributing said radiation among said receptors.

10. The apparatus of claim 7 wherein each of said shields is formed in a shape for completely surrounding the receptor associated thereto when the associated key assembly is actuated.

11. The apparatus of claim 10 wherein each of said receptors has a substantially cylindrical shape and each of said shields has a cylindrical recess sized to receive the associated one of said receptors.

12. The apparatus of claim 7 further including a base member for mounting said receptors, said base member having a resilient layer for providing a substantially radiation impervious shield with the proximal end of at least one of said shields and a cushion stop therefor when the key assembly associated therewith is actuated.

13. The apparatus of claim 7 further including bias means for urging said shields away from said receptors.

14. The apparatus of claim 7 further including a mounting member having a plurality of apertured recesses, each adapted to reciprocably receive a different one of said key assemblies, each said key stem being slidably received by the aperture in the recess associated thereto, each said recess being sized to receive the key top associated thereto; and wherein each said key assembly further includes a bias means engageable with the recess associated thereto and a stop member engageable with said recess when the said key assembly is in a nonactuated position.

* * * * *